V. P. DE KNIGHT.
COIN CONTROLLED SURFACE EXHIBITOR.
No. 11,479. Reissued Mar. 19, 1895.
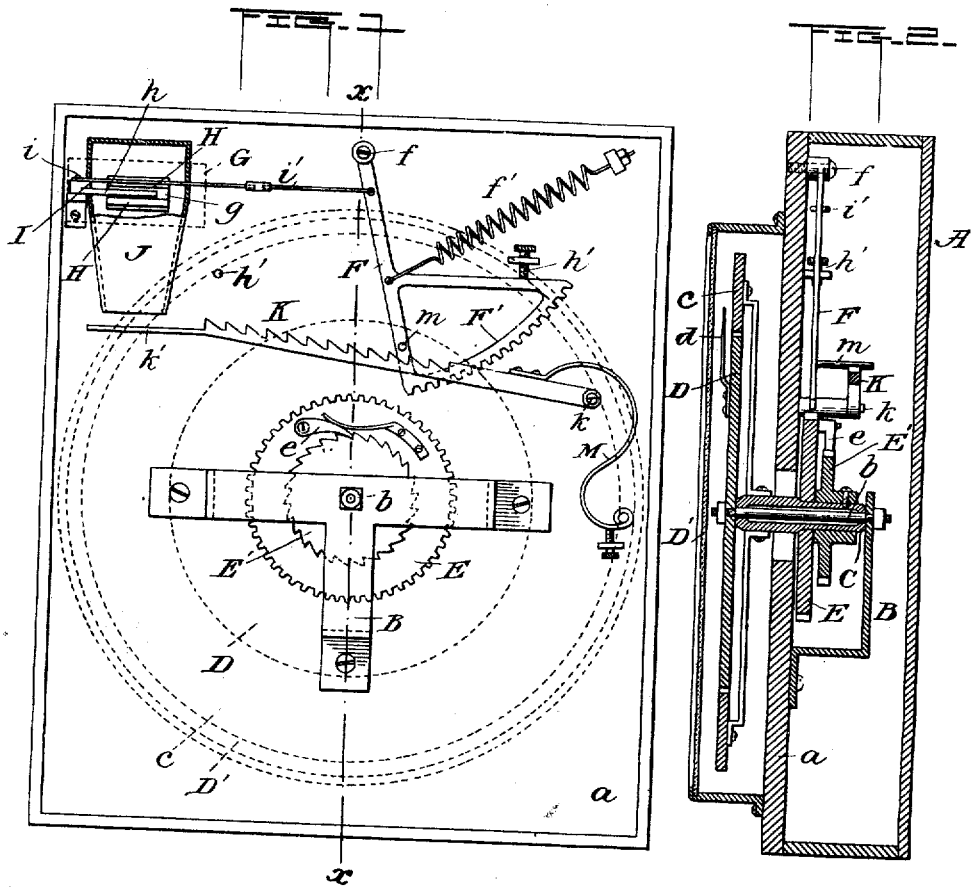
Witnesses
T. A. Connolly
Wm. B. Kendall
Inventor
Victor P. De Knight
By Butterworth & Dowell
his Attorneys
THE NORRIS PETERS CO., PHOTO-LITHO., WASHINGTON, D. C.

UNITED STATES PATENT OFFICE.

VICTOR P. DE KNIGHT, OF WASHINGTON, DISTRICT OF COLUMBIA.

COIN-CONTROLLED SURFACE-EXHIBITOR.

SPECIFICATION forming part of Reissued Letters Patent No. 11,479, dated March 19, 1895.

Original No. 523,569, dated July 24, 1894. Application for reissue filed January 5, 1895. Serial No. 533,988.

*To all whom it may concern:*

Be it known that I, VICTOR P. DE KNIGHT, a citizen of the United States, residing at Washington, in the District of Columbia, have invented certain new and useful Improvements in Coin-Controlled Surface-Exhibitors; and I do hereby declare the following to be a full, clear, and exact description of the invention, such as will enable others skilled in the art to which it appertains to make and use the same.

This invention relates to coin-controlled apparatus, but more particularly to that type of machines in which is employed a rotating surface exhibiting element, usually in the form of a disk, wheel, or drum, having pictures or other matter thereon adapted to be exhibited by the movement of the exhibiting surface past a window or opening provided in the casing within which the rotating element is secured.

One object of the invention is to provide means for putting the rotating surface-exhibiting element in motion by the act of depositing a coin, so as to dispense with the usual auxiliary device such as a pull-rod or push-bar employed in machines of this character as a means for effecting the desired movement of the exhibiting device after a coin has been duly deposited, whereby I avoid the necessity for manipulating such auxiliary devices in order to cause the impelling machinery to operate and put the exhibiting device in motion, and at the same time simplify the machine and increase its efficiency, while decreasing the cost of manufacture.

Another object is to provide means whereby the exhibiting devices are adapted to operate only when a coin is deposited in a legitimate manner, so as to prevent meddlesome or dishonest persons from tampering with or "beating the machine;" this being accomplished by adapting the impelling mechanism to be thrown into position for imparting motion to the exhibiting devices by the deposit of a coin operating directly upon an arm connecting with the impelling mechanism and retained in such position until automatically released by the coin itself in its further passage, so as to permit the impelling mechanism to operate and impart motion to the exhibiting devices. This latter feature of construction for preventing the re-action of the spring in which the impelling power is stored until released by the further passage of the coin, may be dispensed with, but is preferably employed to prevent the machine from being operated by the insertion of a knife blade or the like through the coin slot.

The invention will first be described with reference to the accompanying drawings, which form a part of this specification, and then pointed out in the claims at the end of the description.

In carrying out my invention I may employ as the rotating surface-exhibiting element an annular disk suitably journaled in a casing and adapted to be impelled by the recoil or re-action of a spring acting upon a pivoted lever (which, in the form shown, has a toothed segment) adapted to engage a wheel operatively connected with said disk, together with a movable arm or rocking bell-crank pivotally connected to said lever and adapted to be directly acted upon and forcibly moved by the coin which is being deposited, so as to cause the lever to swing upon its pivot against the action of the spring and thereby store power for rotating or spinning the disk, the lever and spring being preferably held in the desired position until released by the coin in its further passage acting upon a releasing device, whereby I positively effect the desired movement of the exhibiting devices by the introduction of a coin through the coin slot without using a pull-rod or push-bar to complete the operation.

Referring to the accompanying drawings, wherein I have illustrated a preferred form and arrangement of mechanical devices for accomplishing the desired results, Figure 1 represents a rear view of the operating mechanism secured inside of an inclosing casing; the rear wall or plate of said casing being removed. Fig. 2 represents a vertical section taken on the line $x$—$x$ in Fig. 1. Fig. 3 is a plan view of the coin-operated bell-crank lever; and Fig. 4 is a side view of the same and the coin guide plates.

A is an inclosing case of any convenient form or design, and $a$ is a plate to which the working mechanism of the device is secured.

B is a bracket secured to the plate $a$, and $b$ is a journal pin secured to the said bracket and projecting through a hole in the plate $a$.

C is a sleeve journaled on the pin $b$ and arranged to turn thereon with as little friction as possible; and $c$ is a rotating element or exhibiting disk secured to the said sleeve C.

D is a stationary disk secured on the end of the pin $b$. D′ is a glass window arranged in front of the disks D and $c$, but this window may be dispensed with if desired. The front of the disk $c$ is the surface upon which the pictures or other subject matter to be exhibited are placed.

The pictures are exhibited by the disk $c$ when revolved, and may be seen through the window D′. A pointer $d$ or a mark on the disk D is used to call attention to whichever picture or subject that may be behind it when the disk $c$ stops, after having been revolved or spun; or, if desired, the window D′ may be partially opaque and have only a small sight-hole through which a single picture or subject may be displayed in the manner commonly used in picture exhibitors of this class.

The pictures may be men, horses or other figures in racing attitude, or mottoes such as are ordinarily found on wheels of fortune.

E is a toothed wheel operatively connected to the sleeve C. In a simple machine the wheel E is secured to the sleeve C, but it is preferably connected to it by a ratchet mechanism.

E′ is a ratchet wheel secured to the sleeve C, and $e$ is a spring-actuated pawl pivoted to the wheel E and engaging with the ratchet wheel. This ratchet wheel permits the wheel E to run loose on the sleeve C in one direction.

F is a lever having a toothed segment F′ at or near one end, its opposite end being pivoted on the pin $f$ projecting from the plate $a$, and $f'$ is a spring normally holding the toothed segment out of gear with the toothed wheel E.

G is a plate secured to the front of the plate $a$ and provided with a slot $g$ of a size suitable to permit a small coin, such as a cent, to be inserted through it, and to pass through a hole in the plate $a$.

H are guide plates adjacent to the slot $g$. These guide plates are of any convenient size and shape which will prevent the coin from dropping prematurely when thrust into the slot.

I is a bell-crank lever pivoted on the pin $i$ behind the slot $g$. One arm $h$ of this bell-crank lever is arranged in the path of the coin and is preferably curved and provided with a rounded edge so that the coin may slip off it suddenly.

J is the chute the coin slides down after passing through the slot $g$.

The other arm of the bell-crank lever I is pivotally connected to the toothed segment F′ by the rod $i'$.

When a coin is thrust through the slot $g$ it pushes back the arm $h$, as shown in Fig. 3, and moves the toothed segment F′ into gear with the wheel E. When the ratchet mechanism is not used the toothed segment revolves the disk $c$ for a part of a revolution, and the use of the said ratchet mechanism is to permit the toothed segment to revolve the wheel E for a part of a revolution in one direction without turning the disk $c$. When the coin slips off the arm $h$ and falls down the coin chute the spring $f'$ pulls back the toothed segment suddenly. This gives the toothed wheel E and the disk $c$ a sharp spin, and they continue to revolve for some time after the toothed segment has passed out of gear with the wheel E. The impulse given to the disk $c$ is a mere matter of chance depending upon the slipping of the coin off the arm $h$ and the accidental suddenness with which the spring $f'$ is permitted to act. The position of any particular picture or motto on the disk $c$ with regard to the pointer or sight-hole when the disk stops, is therefore a matter of great uncertainty, and this constitutes the attraction or pleasure to be derived by using the device. The toothed segment is preferably provided with stops $h'$ to limit its movements, the stop being made adjustable to vary the throw of the lever.

In order to prevent the device from being used otherwise than by inserting a coin in a legitimate manner, a toothed bar K is pivoted on the pin $k$ projecting from the plate $a$.

M is a spring which normally supports the bar K and holds it in contact with the under side of a pin $m$ which projects from the toothed segment F. The bar K is provided with a plate $k'$ at its end, and this plate is arranged under the coin chute. If a knife blade is inserted through the coin slot, the arm $h$ is pushed back and the toothed segment is turned to the left, but the spring $f'$ fails to spin the disk $c$ because the teeth of the bar K engage with the pin $m$ and prevent the toothed segment from moving to the right.

When the device is operated by a coin inserted in a legitimate manner, the toothed segment is first turned to the left and the pin $m$ caused to engage with one or another of the teeth of the bar K according to the accidental slipping of the coin off the arm $h$, and the toothed segment is then released suddenly by the weight of the coin which falls onto the plate $k'$ and depresses the toothed bar K. The coin then slides off the plate $k'$ and falls to the bottom of the case A.

The spring employed to retract the lever which spins the exhibiting disk is arranged to hold said lever normally out of engagement with the wheel which imparts motion to the disk, as shown and described, but the lever may be retained in engagement with said wheel by adjusting the stop or set screw $h'$, so as to limit its backward movement; the ratchet mechanism permitting the use of the device in either position of the lever, but the first mentioned position is preferred because of the greater freedom of movement.

What I claim is—

1. A coin-controlled apparatus comprising a suitable case having a coin guide slot therein, a rotatable surface exhibiting element, a power storing spring and mechanism connected therewith adapted to rotate said exhibiting element, a pivoted arm arranged in the path of a coin inserted in said slot, and connections between said arm and spring whereby the coin which is being deposited is made to act upon said arm in opposition to the spring so as to cause the latter to store sufficient power to spin said rotating element when the coin has been forced past the arm, substantially as described.

2. A coin-controlled surface exhibiting apparatus comprising a rotatable exhibiting element, a pivoted lever and intermediate connections whereby said element is caused to revolve when said lever is moved in one direction, a plate provided with a coin slot, an arm pivoted behind said slot in the path of a coin deposited therein so as to adapt the arm to be moved by the coin when the latter is forced through the slot, a rod pivotally connecting said arm and pivoted lever, and a spring adapted to yieldingly resist the movement of said lever and arm when the latter is pressed by the coin and to retract the lever and thereby rotate said exhibiting element upon the passage of the coin past the arm substantially as described.

3. In a coin-controlled apparatus having a suitable casing within a coin-slot therein, the combination with a revoluble exhibiting disk, of an arm adapted to be forcibly moved by the deposit of a coin, and intermediate mechanism adapted to revolve said disk, together with a spring-actuated locking bar adapted to prevent the impelling mechanism from revolving the disk until a coin has been deposited and moved past the said arm and thereupon to be automatically released by the coin acting thereon so as to permit the impelling mechanism to start and spin the disk, substantially as described.

4. A coin-controlled surface exhibitor comprising a revoluble disk, a swinging lever and intermediate connections whereby the disk will be revolved when said lever is moved in one direction, a spring opposing the movement of said lever in the reverse direction adapted by its reaction to retract the lever and spin the disk, and a spring-actuated bar adapted to hold said lever when moved by the coin in opposition to the spring until acted upon by the coin in its further passage so as to release the lever and permit the spring to retract the lever and thereby spin the disk, substantially as described.

5. The combination, with a revoluble exhibiting disk, and a toothed wheel operatively connected therewith; of a pivoted toothed segment adapted to gear into the toothed wheel, a plate provided with a coin slot, an arm pivoted behind the slot in the path of the coin, and operated thereby when pushed forcibly through the slot, a rod pivotally connecting the said arm and segment, and a spring normally holding the said segment out of gear with the said wheel operating to retract the segment and spin the exhibiting disk upon the passage of a coin past the said arm, substantially as set forth.

6. The combination, with a revoluble exhibiting disk, a toothed wheel journaled concentric therewith, and ratchet mechanism connecting the said disk and wheel and permitting the wheel to run loose in one direction; of a pivoted toothed segment, a spring normally holding the said segment out of gear with the said wheel, a pivoted arm adapted to be forcibly pushed back by a coin, and a rod pivotally connecting the said arm and segment, whereby the disk is spun upon the passage of a coin past the said arm, substantially as set forth.

7. The combination, with a revoluble exhibiting disk, and a toothed wheel arranged concentric with the disk and operatively connected with it; of a pivoted toothed segment, a spring normally holding the said segment out of gear with the said wheel, and a pivoted arm connected with the said segment, and adapted to be forcibly pushed back by a coin, thereby moving the segment into gear with the wheel and permitting the said spring to retract the said segment and spin the disk when the coin slips past the said arm, substantially as set forth.

8. The combination, with a revoluble exhibiting disk, and a toothed wheel operatively connected therewith; of a pivoted toothed segment provided with a projecting pin, a spring-supported toothed bar engaging with the said pin, coin-controlled operating devices for moving the toothed disk into gear with the said toothed wheel, and a spring for retracting the said toothed segment suddenly and causing the said disk to spin freely upon the insertion and descent of a coin, substantially as set forth.

9. The combination, with a revoluble exhibiting disk, and a toothed wheel operatively connected therewith; of a pivoted toothed segment, a plate provided with a coin slot and coin guide plates, a bell-crank lever pivoted behind the slot and having one arm arranged between the guide plates in the path of the coin, a rod pivotally connecting the other arm of the bell-crank lever with the toothed segment, and a spring normally holding the toothed segment out of gear with the said wheel and operating to spin the said disk upon the insertion of a coin, substantially as set forth.

In testimony whereof I affix my signature in the presence of two witnesses.

VICTOR P. DE KNIGHT.

Witnesses:

J. A. E. CRISWELL,
CHAS. E. RIORDON.

Correction in Reissue Letters Patent No. 11,479.

It is hereby certified that in Reissue Letters Patent No. 11,479, granted March 19, 1895, upon the application of Victor P. De Knight, of Washington, District of Columbia, for an improvement in "Coin-Controlled Surface-Exhibitors," an error appears in the printed specification requiring the following correction, viz: In line 30, page 3, the word "within" should read *with;* and that the said Letters Patent should be read with this correction therein that the same may conform to the record of the case in the Patent Office.

Signed, countersigned, and sealed this 26th day of March, A. D. 1895.

[SEAL.]

JNO. M. REYNOLDS,
*Assistant Secretary of the Interior.*

Countersigned:

JOHN S. SEYMOUR,
*Commissioner of Patents.*